(12) United States Patent
Han et al.

(10) Patent No.: US 12,373,017 B2
(45) Date of Patent: Jul. 29, 2025

(54) ELECTRONIC APPARATUS AND CONTROL METHOD THEREOF

(71) Applicant: SAMSUNG ELECTRONICS CO., LTD., Suwon-si (KR)

(72) Inventors: Sangbok Han, Suwon-si (KR); Kyounghoon Kim, Suwon-si (KR); Sihoon Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 927 days.

(21) Appl. No.: 17/526,651

(22) Filed: Nov. 15, 2021

(65) Prior Publication Data

US 2022/0075437 A1 Mar. 10, 2022

Related U.S. Application Data

(63) Continuation of application No. PCT/KR2021/002373, filed on Feb. 25, 2021.

(30) Foreign Application Priority Data

Jul. 10, 2020 (KR) .......................... 10-2020-0085425

(51) Int. Cl.
 *G06F 1/329* (2019.01)
 *G06F 1/3212* (2019.01)
 (Continued)

(52) U.S. Cl.
 CPC ............ *G06F 1/329* (2013.01); *G06F 1/3212* (2013.01); *G06F 1/3296* (2013.01); *G06F 9/30029* (2013.01)

(58) Field of Classification Search
 CPC ...... G06F 1/329; G06F 1/3212; G06F 1/3296; G06F 9/30029; G06F 17/16;
 (Continued)

(56) References Cited

U.S. PATENT DOCUMENTS 8,041,367 B2 10/2011 Anderson et al.
8,824,810 B2 * 9/2014 Jeong ................... H04N 19/182
                                            382/232

(Continued)

FOREIGN PATENT DOCUMENTS

KR 10-2010-0017122 A 2/2010
KR 10-2018-0050928 A 5/2018
(Continued)

OTHER PUBLICATIONS

Notice of Allowance dated Aug. 26, 2024, issued by Korean Patent Center in Korean Patent Application No. 10-2020-0085425.

(Continued)

*Primary Examiner* — Hoang M Nguyen
(74) *Attorney, Agent, or Firm* — Sughrue Mion, PLLC

(57) ABSTRACT

An electronic apparatus may include a memory, and a processor configured to perform an operation between a first index data and a second index data corresponding to a first data set and a second data set, respectively, to acquire first output data; identify a sparsity ratio of the first output data; based on the sparsity ratio exceeding the threshold value, determine a first method of processing the first data set and the second data set using the first data set and the second data set, as an operation method of the electronic apparatus; and based on the sparsity ratio being equal to or less than the threshold value, identify valid data included in the first index data and the second index data, and determine a second method of processing the first data set and the second data set using the valid data, as the operation method of the electronic apparatus.

20 Claims, 11 Drawing Sheets

(51) Int. Cl.
*G06F 1/3296* (2019.01)
*G06F 9/30* (2018.01)

(58) Field of Classification Search
CPC ...... G06F 9/3004; G06F 9/28; G06F 9/30105; G06F 9/345; Y02D 10/00; G06N 3/08
See application file for complete search history.

(56) References Cited

U.S. PATENT DOCUMENTS

| | | | |
|---|---|---|---|
| 10,755,126 | B2 | 8/2020 | Son et al. |
| 11,568,303 | B2 | 1/2023 | Kim et al. |
| 11,892,925 | B2 | 2/2024 | Choi et al. |
| 2008/0261613 | A1 | 10/2008 | Anderson et al. |
| 2010/0131202 | A1* | 5/2010 | Dannevik ............... G01W 1/00 702/181 |
| 2015/0113031 | A1 | 4/2015 | Reinwald et al. |
| 2018/0024746 | A1 | 1/2018 | Jagadeesh et al. |
| 2018/0129893 | A1* | 5/2018 | Son ...................... G06N 3/04 |
| 2018/0131946 | A1 | 5/2018 | Lee et al. |
| 2018/0204110 | A1 | 7/2018 | Kim et al. |
| 2018/0293691 | A1 | 10/2018 | Nurvitadhi et al. |
| 2019/0042250 | A1 | 2/2019 | Anders et al. |
| 2019/0042538 | A1 | 2/2019 | Koren et al. |
| 2019/0228284 | A1 | 7/2019 | Holland |
| 2019/0311302 | A1 | 10/2019 | Kim et al. |
| 2019/0392323 | A1 | 12/2019 | Yan et al. |
| 2020/0125893 | A1 | 4/2020 | Choi et al. |
| 2020/0143250 | A1 | 5/2020 | Lee |
| 2021/0286422 | A1* | 9/2021 | Kang ................... G06F 3/0679 |
| 2022/0376980 | A1* | 11/2022 | Bhat ...................... G16Y 40/30 |
| 2025/0021148 | A1* | 1/2025 | Gladwin ................ G06F 1/263 |

FOREIGN PATENT DOCUMENTS

| | | |
|---|---|---|
| KR | 10-2018-0052063 A | 5/2018 |
| KR | 10-2018-0052069 A | 5/2018 |
| KR | 10-2018-0084289 A | 7/2018 |
| KR | 10-2019-0118332 A | 10/2019 |
| KR | 10-2020-0046188 A | 5/2020 |
| KR | 10-2020-0052182 A | 5/2020 |

OTHER PUBLICATIONS

Gondimalla, Ashish et al., "SparTen: A Sparse Tensor Accelerator for Convolutional Neural Networks", MICRO'19, Oct. 12-16, 2019, pp. 151-165. (15 pages total).

International Search Report (PCT/ISA/210) issued Jun. 16, 2021 by the International Searching Authority in counterpart International Patent Application No. PCT/KR2021/002373.

Written Opinion (PCT/ISA/237) issued Jun. 16, 2021 by the International Searching Authority in counterpart International Patent Application No. PCT/KR2021/002373.

* cited by examiner

ELECTRONIC APPARATUS AND CONTROL METHOD THEREOF

CROSS-REFERENCE TO RELATED APPLICATION

This application is a Continuation Application of International Application No. PCT/KR2021/002373, filed on Feb. 25, 2021, which claims benefit of Korean Patent Application No. 10-2020-0085425, filed on Jul. 10, 2020, in the Korean Intellectual Property Office, the disclosures of which are incorporated herein by reference in their entireties.

BACKGROUND

1. Field

The disclosure relates to an electronic apparatus for processing a data set based on a sparse component included in the data set, and a control method thereof.

2. Description of the Related Art

Artificial neural networks that learn based on machine learning algorithms (e.g., deep learning algorithms) are being developed and utilized in various fields, and artificial neural networks may learn or infer based on various types of input data. For example, an artificial neural network may learn or infer by performing a multiplication operation on vector data and outputting a result.

Meanwhile, since zero (0) becomes 0 by performing a multiplication operation with a certain value, there is no need to perform a multiplication operation on 0. Thus, when a large amount of 0 is included in a vector data to be multiplied, the artificial neural network can output a result data more efficiently by performing the multiplication operation only on values other than 0.

Therefore, a technology has been developed to add various operation modules to an artificial neural network to perform operations only on data other than 0 included in a data set. However, in related art, operation performance could be improved by compressively performing operations on data by adding an additional operation module to the artificial neural network, but there is a disadvantage in that energy consumption is increased. In addition, in the related art, when data is compressed and processed even though a large amount of zeros are not included in the data set, there is a limitation in that energy consumption is excessively large compared to the improved operation performance.

SUMMARY

One or more example embodiments provide an electronic apparatus for determining an operation method according to a sparsity ratio included in a plurality of data sets, and acquiring output data using the determined operation method, and a method for controlling thereof.

According to an aspect of the disclosure, an electronic apparatus may include: a memory; and a processor configured to: perform an operation between a first index data and a second index data corresponding to a first data set and a second data set, respectively, to acquire first output data; identify a sparsity ratio of the first output data; based on whether the sparsity ratio exceeds a threshold value, determine an operation method corresponding to the sparsity ratio from among a plurality of operation methods; and acquire second output data with respect to the first index data and the second index data by using the determined operation method, wherein the processor may be configured to: based on the sparsity ratio exceeding the threshold value, determine, as the operation method, a first method of processing the first data set and the second data set using the first data set and the second data set; and based on the sparsity ratio being equal to or less than the threshold value, identify valid data included in the first index data and the second index data, and determine, as the operation method, a second method of processing the first data set and the second data set using the valid data.

The processor may be configured to: based on at least one of status information of the electronic apparatus and types of the first data set and the second data set, determine the threshold value, and based on the threshold value, determine the operation method corresponding to the sparsity ratio from among the plurality of operation methods.

The status information of the electronic apparatus may include at least one of a remaining battery level of the electronic apparatus and a usage amount of the processor.

The processor may be further configured to: based on the remaining battery level of the electronic apparatus exceeding a predetermined value, determine the threshold value as a first numerical value, and based on the remaining battery level being equal to or less than the predetermined value, determine the threshold value as a second numerical value, wherein the first numerical value may be less than the second numerical value.

The processor may be further configured to: identify a degree of urgency that corresponds to the types of the first data set and the second data set, based on the degree of urgency exceeding a predetermined value, determine the threshold value as a third numerical value, and based on the degree of urgency being equal to or less than the predetermined value, determine the threshold value as a fourth numerical value, wherein the third numerical value may be less than the fourth numerical value.

The processor may be further configured to: group adjacent data of the first index data by a predetermined size as a first data group, and group adjacent data of the second index data by the predetermined sized as a second data group; determine a first representative value and a second representative value of the first data group and the second data group; perform a logic operation between the first representative value and the second representative value to acquire third output data, and identify a sparsity ratio of the third output data; based on whether the sparsity ratio of the third output data exceeds the threshold value, determine the operation method based on the sparsity ratio of the third output data.

The processor may be configured to: based on at least one of the status information of the electronic apparatus and the types of the first data set and the second data set, determine another logic operation to be performed between the first data group and the second data group, and process the first data group and the second data group by using the other logic operation to determine the first representative value and the second representative value.

The processor may be further configured to: based on the remaining battery level of the electronic apparatus exceeding a predetermined value, determine the logic operation to be performed between the first data group and the second data group as an AND operation, and based on the remaining battery level of the electronic apparatus being equal to or less than the predetermined value, determine the logic operation to be performed between the first data group and the second data group as an OR operation.

The processor may be further configured to: based on a user command for changing the threshold value being input, change the threshold value according to the user command, and based on whether the sparsity ratio exceeds the changed threshold value, determine the operation method corresponding to the sparsity ratio from among the plurality of operation methods.

The processor may be further configured to: based on the operation method corresponding to the sparsity ratio being determined as the first method, restore the first data set and the second data set by using data corresponding to the first index data, the second index data, and the valid data, and process the restored first data set and the restored second data set to acquire the second output data.

According to another aspect of the disclosure, a method for controlling an electronic apparatus may include: performing an operation between a first index data and a second index data corresponding to a first data set and a second data set, respectively to acquire first output data; identifying a sparsity ratio of the first output data; based on whether the sparsity ratio exceeds a threshold value, determining an operation method corresponding to the sparsity ratio from among a plurality of operation methods; and acquiring second output data with respect to the first index data and the second index data by using the determined operation method, wherein the determining the operation method may include: based on the sparsity ratio exceeding the threshold value, determining, as the operation method, a first method of processing the first data set and the second data set using the first data set and the second data set, and based on the sparsity ratio being equal to or less than the threshold value, identifying valid data included in the first index data and the second index data, and determining, as the operation method, a second method of processing the first data set and the second data set using the valid data.

The method may further include: based on at least one of status information of the electronic apparatus and types of the first data set and the second data set, determining the threshold value; and based on the threshold value, determining the operation method corresponding to the sparsity ratio from among the plurality of operation methods.

The status information of the electronic apparatus may include at least one of a remaining battery level of the electronic apparatus and a usage amount of a processor of the electronic apparatus.

The determining the operation method may include, based on the remaining battery level of the electronic apparatus exceeding a predetermined value, determining the threshold value as a first numerical value, and based on the remaining battery level being equal to or less than the predetermined value, determining the threshold value as a second numerical value, wherein the first numerical value may be less than the second numerical value.

The determining the operation method may include identifying a degree of urgency that corresponds to the types of the first data set and the second data set; based on the degree of urgency exceeding a predetermined value, determining the threshold value as a third numerical value; and based on the degree of urgency being equal to or less than the predetermined value, determining the threshold value as a fourth numerical value, wherein the third numerical value may be less than the fourth numerical value.

According to another aspect of the disclosure, a non-transitory computer-readable storage medium storing a program that is executable by at least one processor is provided to perform a method for controlling an electronic apparatus, the method including: obtaining first output data based on a first index data of a first data set and a second index data of a second data set; based on a sparsity ratio of the first output data exceeding a threshold value, obtaining second output data by processing the first data set and the second data set using a first operation method; and based on the sparsity ratio of the first output data not exceeding the threshold value, obtaining third output data by processing the first data set and the second data set using a second operation method that is different from the first operation method.

The method may further include: setting the threshold value differently according to a remaining battery level of the electronic apparatus.

The method may further include: setting the threshold value differently according to an energy usage amount of the at least one processor.

The obtaining of the first output data may include: based on a remaining battery level of the electronic apparatus exceeding a predetermined value, performing an AND operation on immediately adjacent data bits of each of the first index data and the second index data, to obtain the first output data, and based on the remaining battery level of the electronic apparatus exceeding the predetermined value, performing an OR operation on the immediately adjacent data bits of each of the first index data and the second index data, to obtain the first output data.

The obtaining of the first output data may include: based on an energy usage amount of the processor exceeding a predetermined value, performing an AND operation on immediately adjacent data bits of each of the first index data and the second index data, to obtain the first output data, and based on the energy usage amount of the processor exceeding the predetermined value, performing an OR operation on the immediately adjacent data bits of each of the first index data and the second index data, to obtain the first output data.

BRIEF DESCRIPTION OF DRAWINGS

The above and/or other aspects will be more apparent by describing certain example embodiments, with reference to the accompanying drawings, in which.

DETAILED DESCRIPTION

Figure 1A:
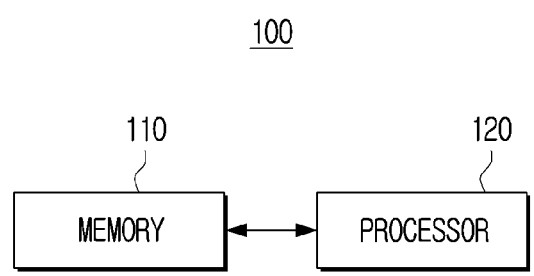
FIG. 1A is a block diagram schematically illustrating a configuration of an electronic apparatus according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The disclosure provides an electronic apparatus that determines an operation method based on a sparsity ratio of index data corresponding to a plurality of data sets, and acquires output data for a plurality of data sets using the determined operation method and to a control method thereof.

Specifically, when a plurality of data sets contain a large number of sparse components (e.g., zero (0) values), the electronic apparatus may identify valid data to which data to be operated is matched among valid data included in index data corresponding to the plurality of data sets, and perform an operation between data matched to the identified valid data to increase operational performance. In other words, data (e.g., non-zero value data) on which an actual operation is to be performed excluding 0 included in the plurality of data sets may be identified and operation performance may be increased by compressively performing an operation on only the identified valid data.

However, in the case of the corresponding operation method, valid data matched with data to be actually operated from among valid data included in a plurality of index data within one cycle may be identified, and since a large amount of hardware modules including various operation logic (e.g., adder logic, encoder logic, etc.) are required to perform an operation in order to perform an operation between the identified valid data matched data, energy consumption may increase. In addition, when a corresponding operation method is performed even though a plurality of data sets do not contain a lot of sparse components, operation performance is not significantly increased and only energy consumption may increase inefficiently. Accordingly, the electronic apparatus of the disclosure may identify a sparsity ratio between a plurality of data sets and efficiently acquire output data by changing an operation method according to the sparsity ratio.

The example embodiments of the disclosure will be described in greater detail below in a manner that will be understood by one of ordinary skill in the art.

FIG. 1A is a block diagram illustrating configuration of an electronic apparatus 100 according to an embodiment. As illustrated in FIG. 1A, the electronic apparatus 100 may include a memory 110 and a processor 120. However, the configuration illustrated in FIG. 1A is an exemplary diagram for implementing embodiments of the disclosure, and appropriate hardware and software configurations at a level obvious to those skilled in the art may be additionally included in the electronic apparatus 100.

The memory 110, for example, may store a command or data regarding at least one of the other elements of the electronic apparatus 100. The memory 110 may be accessed by the processor 120, and perform readout, recording, correction, deletion, update, or the like, on data by the processor 120.

The memory 110 may store an instruction set corresponding to at least one program executable by the processor 120. An instruction means one action statement that can be directly executed by the processor 120 in a programming language, and is a minimum unit for program execution or operation.

The memory 110 may store feature data of data input through an inputter, etc., and the feature data may be a data set implemented as a vector, a matrix, or the like. For example, the feature data may include feature data of a voice input through a microphone and feature data of an image acquired through a camera.

The memory 110 may store various artificial neural networks. The artificial neural network may include a plurality of layers, and the plurality of layers may include a plurality of data sets (e.g., a kernel data set, a weight data set, or the like). Artificial neural networks may include convolutional neural network (CNN), deep neural network (DNN), recurrent neural network (RNN), restricted Boltzmann machine (RBM), deep belief network (DBN), bidirectional recurrent deep neural network (BRDNN), Deep Q-Networks, or the like, and the artificial neural network in the disclosure is not limited to the example described above except as otherwise specified.

The memory 110 may store index data corresponding to a data set included in a plurality of layers. The index data is data that may indicate whether a weight value mapped to a plurality of elements (or components) of a data set is 0. For example, when the data set is implemented as a 1×9 vector, 9 elements may be included in the data set, and a weight value of 0 or a non-zero weight value may be mapped to each element. And, the index data corresponding to the data set may be implemented as a 1×9 vector, and each element may be mapped to a value of 0 or 1. When a weight value of 0 is mapped to a specific element of the data set, a value of 0 is mapped to a corresponding specific element of the index data. When a weight value other than 0 is mapped to a specific element of the data set, 1 is mapped to a specific element corresponding to the index data. And, a valid data may mean an element to which one of the elements included in the index data is mapped. Accordingly, when valid data is included in a third element of the index data, it may mean that a non-zero weight is mapped to the third data in the data set.

The memory 110 may be implemented as a non-volatile memory, a volatile memory, a flash memory, a hard disk drive (HDD) or a solid state drive (SDD). According to an embodiment of the disclosure, the term of the storage may include the memory 110, read-only memory (ROM) (not illustrated) and random access memory (RAM) (not illustrated) within the processor 120, and a memory card (not illustrated) attached to the electronic apparatus 100 (e.g., micro secure digital (SD) card or memory stick).

The processor 120 may be electrically connected to the memory 110 to control overall operations and functions of the electronic apparatus 100. In describing the disclosure, the processor 120 may include one or a plurality of processors. In this case, one or a plurality of processors 120 is a general-purpose processor such as central processing unit (CPU), application processor (AP), digital signal processor (DSP), etc., graphics-only processor such as graphics processing unit (GPU), vision processing unit (VPU), or an artificial intelligence-only processor such as a neural processing unit (NPU).

The processor 120 may acquire index data corresponding to a plurality of data sets. Specifically, the processor 120 may acquire a data set corresponding to data (e.g., audio data, a natural language data, image data, etc.) input through an inputter.

For example, the processor 120 may perform a word embedding for the text data input through an inputter to acquire a data set, or input image data or voice data into the artificial intelligence model to acquire a data set corresponding to the image data or voice data. Meanwhile, word embedding may refer to an algorithm for digitizing a word constituting text into a vector or matrix corresponding thereto.

The processor 120 may acquire index data corresponding to the acquired data set. In addition, the processor 120 may acquire first output data by performing an operation between index data corresponding to a plurality of data sets, and identify a sparsity ratio of the first output data. The above operation will be described in detail with reference to FIG. 1B.

Figure 1B:
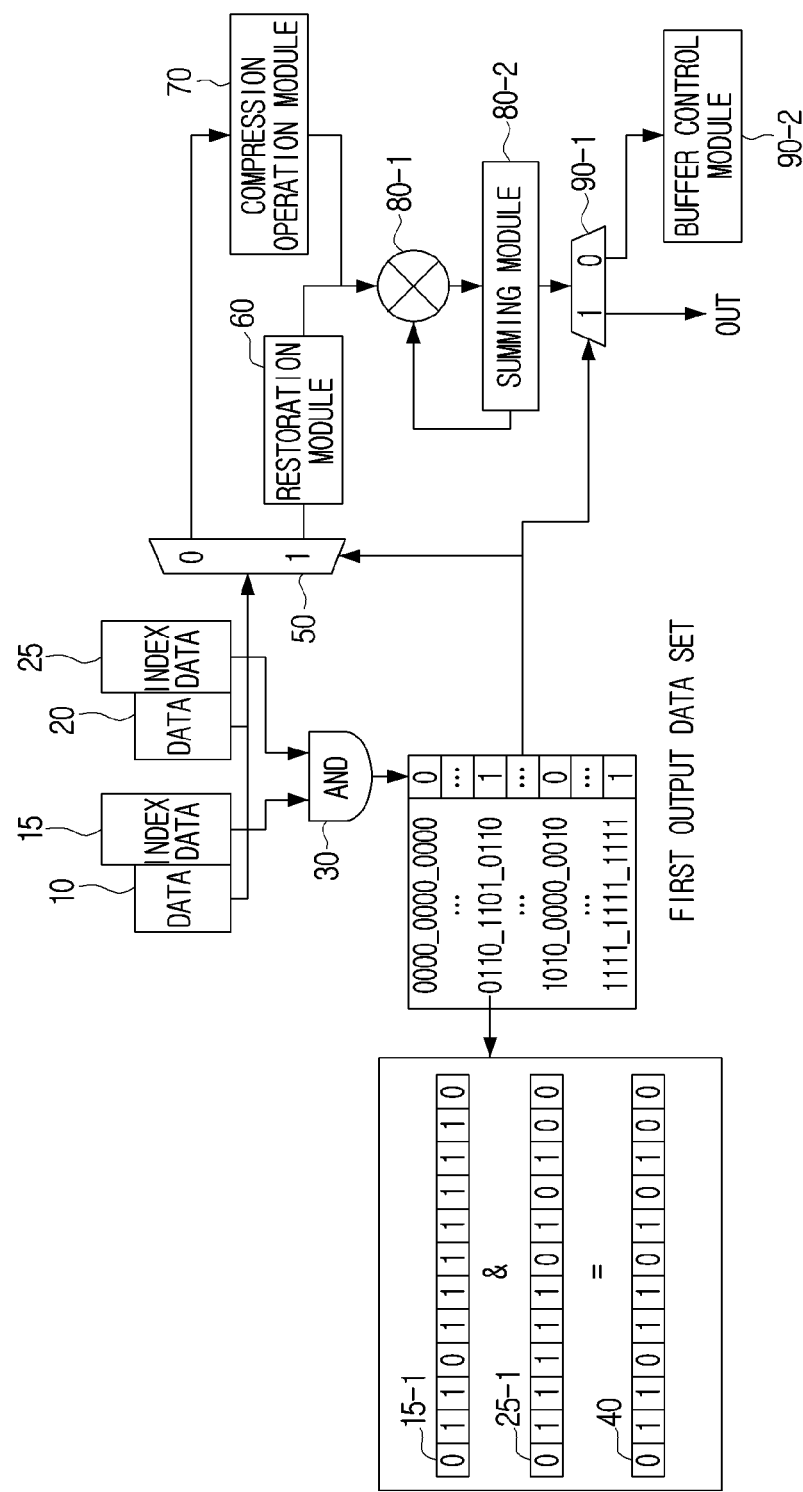
FIG. 1B illustrates a method of processing a data set according to an embodiment.

As shown in FIG. 1B, the processor 120 may input a first index data 15 corresponding to a first data set and a second index data 25 corresponding to a second data set to a module (e.g., an AND logic gate) 30 performing an AND operation to acquire a first output data. The AND operation is one of bitwise operations that perform a logical operation in a unit of bit, and outputs 1 only when all of the data corresponding to each of the two index data are 1, and outputs 0 in other cases. For example, the processor 120 may input each of the first index data 15-1 and the second index data 25-2 including 12 elements to the module 30 that performs an AND operation to acquire a first output data 40. The first index data 15-1 is [0, 1, 1, 0, 1, 1, 1, 1, 1, 1, 1, 0], and the second index data 25-2 is [0, 1, 1, 1, 1, 1, 0, 1, 0, 1, 0, 0], so the first output data 40 according to the AND operation is [0, 1, 1, 0, 1, 1, 0, 1, 0, 1, 0, 0].

The processor 120 may identify a sparsity ratio of the acquired first output data. The sparsity ratio means a ratio of elements in which 0 is mapped among all elements in the first output data. For example, the first output data 40 may identify a sparsity ratio of the first output data to be about 50%, since elements to which 0 is mapped out of a total of 12 elements are 6 elements.

The processor 120 may determine an operation method corresponding to the identified sparsity ratio among a plurality of operation methods based on whether the identified sparsity ratio exceeds a threshold value. When the identified sparsity ratio is equal to or less than the threshold value, the processor 120 may determine a first method of directly performing an operation between a plurality of data sets among a plurality of operation methods. In other words, the first method is a method of performing a multiplication operation between weight values mapped to each of a plurality of data sets, and summing result values acquired by the multiplication operation to acquire output data.

When the identified sparsity ratio exceeds the threshold value, the processor 120 may identify valid data matching data to be operated among the index data among a plurality of operation methods, and determine a second method for performing an operation between the data matched to the identified valid data. In other words, the second method may include identifying valid data matched with data to be operated on each index data using the first output data, and compressively perform an operation only on data matched with the identified valid data.

Specifically, the processor 120 may acquire a parameter corresponding to the first output data based on whether a sparsity ratio of the first output data exceeds a threshold value. The processor 120 may determine the operation method by inputting the acquired parameter to an operation method determination module 50. A parameter acquired by the processor 120 is a variable predefined to determine the operation method, and the operation method determination module 50 is a module that can determine the operation method differently according to an input parameter.

For example, as shown in FIG. 1B, when a sparsity ratio of the first output data is 50% and a threshold value is 80%, the processor 120 may identify that the sparsity ratio of the first output data is less than or equal to the threshold value. The processor 120 may output a parameter corresponding to the first operation method and input the output parameter to the operation method determination module 50. Meanwhile, although it is illustrated in FIG. 1B that the parameter corresponding to the first operation method is 1, this is only an example and may be implemented in various ways. In addition, the processor 120 may determine the first method among the plurality of operation methods through the operation method determination module 50 to which the parameter corresponding to the first operation method is input.

As another example, when the sparsity ratio of the first output data is 50% and the threshold value is 30%, the processor 120 may identify that the sparsity ratio of the first output data exceeds the threshold value. The processor 120 may output a parameter corresponding to the second operation method and input the output parameter to the operation method determination module 50.

In addition, the processor 120 may determine the second method among the plurality of operation methods through the operation method determination module 50 to which the parameter corresponding to the second operation method is input. Meanwhile, although it is illustrated in FIG. 1B that the parameter corresponding to the second operation method is 0, this is only an example and may be implemented in various ways.

In one embodiment, when it is determined as the first method among the plurality of operation methods, the processor 120 may restore the plurality of data sets by inputting the index data 15 and 25 corresponding to the plurality of data sets and the data 10 and 20 corresponding to each index data and valid data to a restoration module 60.

Meanwhile, the data 10 and 20 corresponding to valid data among each index data may mean compressed data compressed by excluding sparse components from each of the plurality of data sets. Thus, if the first data set is [0, 12, 5, 6, 0, 0, 5], data corresponding to valid data among the index data of the first data set, that is, compressed data may be [12, 5, 6, 5].

The restoration module 60 is a module capable of restoring an existing data set based on data corresponding to index data and valid data, and may be expressed as a decompression module. In addition, the processor 120 may perform a multiplication operation 80-1 between the restored data sets and add all result values through a summing module 80-2 to acquire second output data. A detailed description of the first operation method using the restoration module 60 will be described with reference to FIG. 2B.

In another embodiment, when it is determined as the second method among the plurality of operation methods, the processor 120 may input the first output data 40 and data (or compressed data) 10 corresponding to valid data of each index data to a compression operation module 70 to identify valid data matched with data to be operated among valid data included in each index data.

Meanwhile, the compression operation module 70 may include a module for identifying valid data information on which an actual operation is performed among index data (or a priority encoder module) and a module for loading data matching valid data to be identified (or a prefix sum module). Also, the compression operation module 70 may be expressed as an inner join logic module.

Specifically, the processor 120 may, through the compression operation module 70, identify an index (or order) of the element to which non-zero data is commonly mapped to the first data set and the second data set by using the first output data 40. For example, since 1 is mapped to the 2nd, 3rd, 5th, 6th, 8th, and 10th elements of the first output data, the processor 120 may identify, through the compression operation module 70, valid data matched with data to be performed is the 2nd, 3rd, 5th, 6th, 8th, and 10th valid data among valid data included in index data corresponding to each of the first data set and the second data set.

The processor 120 may perform, through the compression operation module 70, a multiplication operation 80-1 between the data matched to the 2nd, 3rd, 5th, 6th, 8th, and 10th valid data identified among the valid data 10 and 20 included in each index data, and acquire the second output data by adding all result values through the summing module 80-2. A detailed description of the second operation method will be described in detail with reference to FIG. 2A.

The processor 120 may input the second output data acquired through the summing module 80-2 to the output module 90-1. The processor 120 may transmit the second output data to the other component when a parameter having a value of 1, among the parameters obtained through the sparsity ratio, is input through the output module 90-1. The processor 120 may temporarily store the second output data in a buffer control module 90-2 when a parameter having a value of 0, among the parameters obtained through the sparsity ratio, is input through the output module 90-1.

The processor 120 may determine a size of a threshold value based on at least one of status information of the electronic apparatus and types of a plurality of data sets. In other words, the processor 120 may determine the size of the threshold value differently according to a variable state of the electronic apparatus and a degree of urgency matched to types of the plurality of data sets.

Meanwhile, the status information of the electronic apparatus may include at least one of a remaining battery level of the electronic apparatus 100, a usage amount of the processor 120, and available resources. In addition, the processor 120 may determine the threshold value differently based on both the status information of the electronic apparatus 100 and the degree of urgency matched to the types of the plurality of data sets.

In an embodiment, when the remaining amount of the battery of the electronic apparatus 100 exceeds a predetermined value, the processor 120 may determine the size of the threshold as a first numerical value, and when the remaining amount of the battery of the electronic apparatus 100 is less than or equal to the predetermined value, the processor 120 may determine the size of the threshold as a second numerical value greater than the first numerical value. In other words, when the remaining battery level is small, it may be more important to reduce energy consumption than to improve a performance of data set operation. Thus, the processor 120 may increase a probability of outputting a parameter value for determining a first method with low energy consumption among a plurality of operation methods by increasing a value of the threshold value as the remaining amount of the battery decreases.

In another embodiment, when a usage of the processor 120 exceeds a predetermined value, the processor 120 may determine a size of the threshold value as a second numerical value, and when the usage of the processor 120 is less than or equal to the predetermined value, the processor 120 may determine the size of the threshold as a first numerical value smaller than the second numerical value. In other words, the processor 120 may increase a probability of outputting a parameter value for determining the first method with low energy consumption among the plurality of operation methods by increasing a numerical value of the threshold value when the amount of available resources exceeds a predetermined value and the amount of available resources of the processor 120 is small.

In another embodiment, different urgency may apply to each type of a plurality of data sets. For example, since a data set, or the like, for processing the user voice or a data set to be processed for execution of a navigation application must be urgently processed, a high degree of urgency may be applied. Meanwhile, since a data set for processing image data or the like may not need to be processed relatively urgently, a relatively low value of urgency may be applied. Accordingly, the processor 120 may identify a urgency for each type of the plurality of data sets.

When the identified urgency exceeds the predetermined value, the processor 120 may determine a size of the threshold as a third numerical value, and when the identified urgency is less than or equal to the predetermined value, the processor 120 may determine the size of the threshold as a fourth value greater than the third numerical value. In other words, when the types of the plurality of data sets require a quick (or urgent) response, the processor 120 may increase the probability of outputting a parameter value for determining a second method capable of increasing an operation speed among a plurality of operation methods by decreasing a numerical value of the threshold value.

Figure 1C:
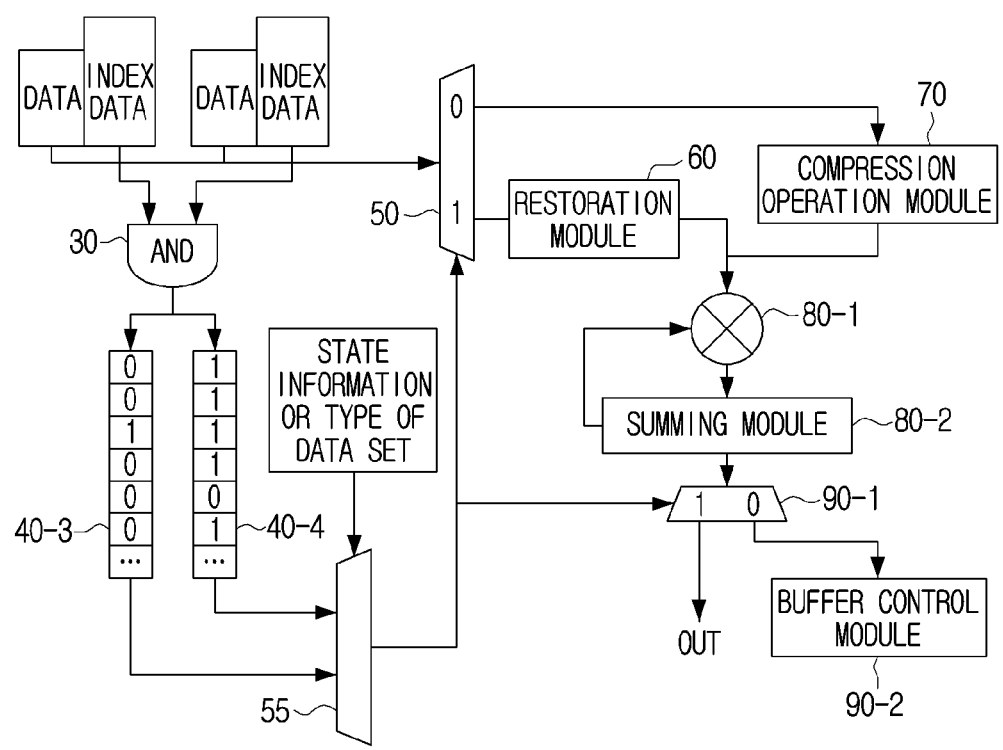
FIG. 1C illustrates a method of processing a data set based on status information of the electronic apparatus or an urgency level matched to the data set, according to an embodiment.

In another embodiment, as shown in FIG. 1C, the processor 120 may acquire a first parameter set 40-3 corresponding to the first output data obtainable when the threshold value is a first numerical value, and may acquire a second parameter set 40-4 corresponding to the first output data obtainable when the threshold value is a second numerical value greater than the first numerical value. In addition, the processor 120 may determine one of a plurality of parameter sets 40-3 and 40-4 through the threshold value determination module 55 based on at least one of the status information of the electronic apparatus 100 and the types of the plurality of data sets.

The processor 120 may input the plurality of determined parameter sets into the operation method determination module 50 to determine one of the plurality of operation methods. For example, when the remaining battery level of the electronic apparatus 100 exceeds a predetermined value, the processor 120 may input, into the operation method determination module 50, the first parameter set 40-3 obtained when the threshold value is the first numerical value among the plurality of parameter sets. As another example, when the degree of urgency matched to the plurality of data sets is less than or equal to a predetermined value, the processor 120 may input, into the operation method determination module 50, the second parameter set 40-4 obtained when the threshold value is the second numerical value among the plurality of parameter sets.

Figure 1D:
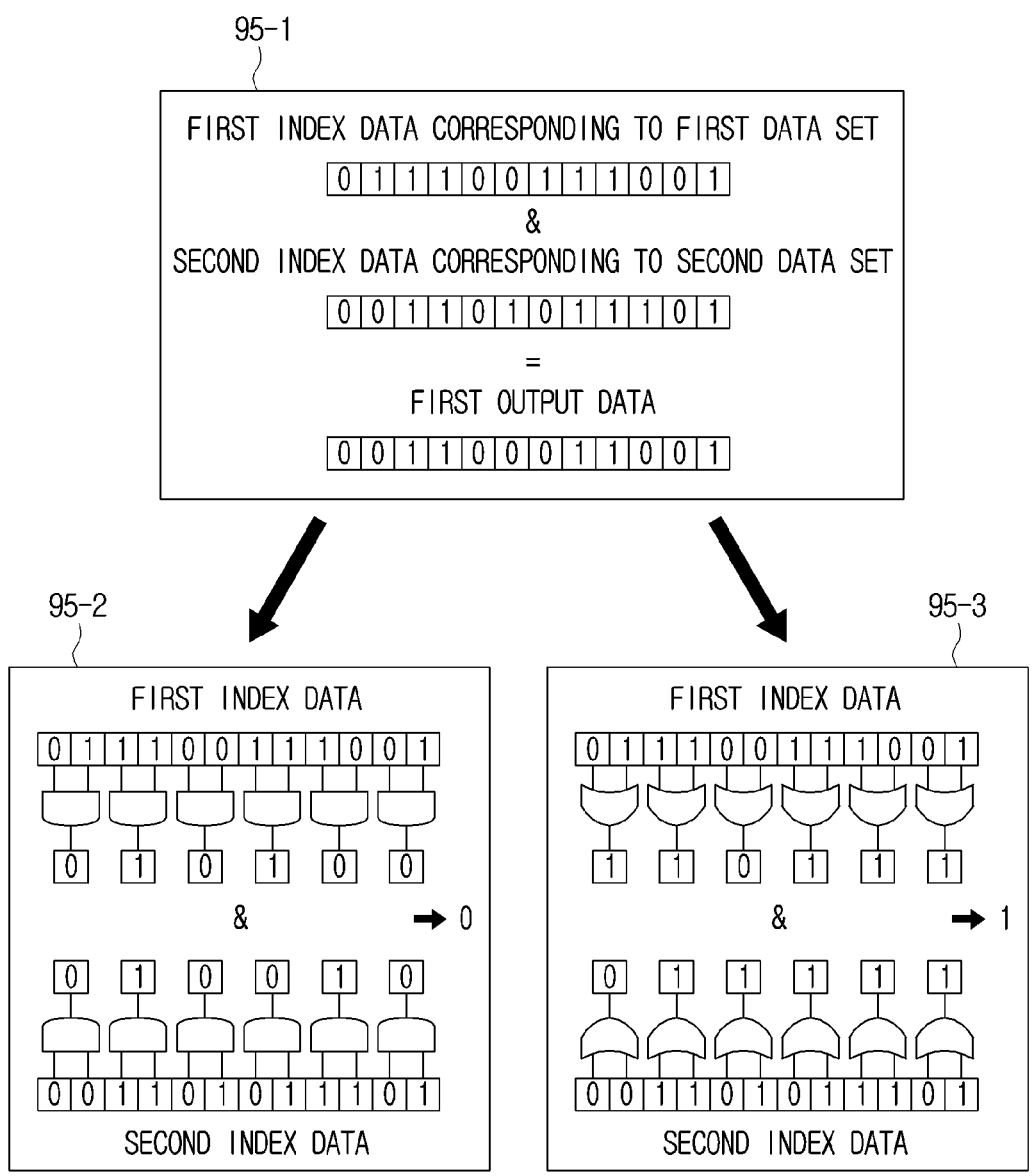
FIG. 1D illustrates a method of processing a data set according to an embodiment.

As illustrated in FIG. 1D, the processor 120 may acquire the first output data by performing an operation on only some of the elements included in first and second index data. It is not necessary to identify an accurate sparsity ratio of the first output data in order to determine the operation method, and a distribution of the sparse component of the data may have locality. In other words, there is a high probability that non-zero data is mapped around non-zero values in the data set. Accordingly, the processor 120 may acquire the first output data by performing an AND operation 95-1 between all elements included in the first and second index data, but adjacent data among the first and second index data may be grouped by a predetermined size, and data for determining an operation method may be output using a representative value of the grouped data. Through the above method, the processor 120 may increase the speed of determining the operation method.

Specifically, the processor 120 may acquire third output data by performing an operation between the index data including the determined representative value of the grouped data, and identify a sparsity ratio of the acquired third output data. In addition, the processor 120 may determine an operation method corresponding to the sparsity ratio of the third output data from among a plurality of operation methods based on whether the identified sparsity ratio of the third output data exceeds a threshold value.

The processor 120 may determine a predetermined size for grouping based on at least one of the status information of the electronic apparatus and at least one of the types of the plurality of data sets, and determine an operation method between the grouped data, and perform an operation between the grouped data using the determined operation method to determine a representative value.

For example, when the remaining amount of the battery of the electronic apparatus exceeds a predetermined value, the processor 120 may determine the predetermined size as a fifth numerical value and determine an AND operation as an operation method between grouped data. Referring to an operation procedure of 95-2, the processor 120 may group each of the first and second index data by 2 bits, and perform an AND operation between the grouped data to determine a representative value.

As another example, when the remaining amount of the battery of the electronic apparatus is less than or equal to a predetermined value, the processor 120 may determine the operation method between the grouped data as an OR operation. Specifically, the processor 120 may group each of the first and second index data into a unit of a predefined size and determine a representative value by performing an OR operation between data. In this case, the OR operation is one of bitwise operations that perform logical operations in bit units, and when all data corresponding to each of the two index data are 0, 0 may be output, and in the other cases, 1 may be output. Also, although it is shown that the predefined size unit is 2 bits in FIG. 1D, this is only an example, and the size unit for grouping may be changed by the user.

The processor 120 may acquire third output data by performing an operation between the determined representative values corresponding to the first and second index data. The processor 120 may determine an operation method corresponding to a sparsity ratio among a plurality of operation methods based on whether the acquired sparsity ratio of the third output data exceeds a threshold value. In other words, when the remaining amount of the battery of the electronic apparatus is equal to or less than a predetermined value, the processor 120 may determine an OR operation as an operation method between grouped data to increase a probability of having a representative value of 1. Accordingly, a probability that the sparsity ratio of the third output data does not exceed the threshold value may increase, and a probability of determining the first operation method that consumes less energy among the plurality of operation methods may increase.

A function related to artificial intelligence (AI) applied to an artificial neural network, or the like, according to the disclosure is operated through the processor 120 and the memory 110. One or more processors 120 may control to process input data according to a predefined operation rule or artificial intelligence model stored in the memory 110. Alternatively, when one or more processors are AI-only processors, the AI-only processor may be designed with a hardware structure specialized for processing a specific AI model.

The predefined operation rule or artificial intelligence model is characterized in that it is generated through learning. Here, being generated through learning means that a basic artificial intelligence model is learned using a plurality of learning data by a learning algorithm, such that a predefined operation rule or artificial intelligence model set to perform a desired characteristic (or purpose) is generated. Such learning may be performed in the device itself on which artificial intelligence according to the disclosure is performed, or may be performed through a separate server and/or system.

Examples of a learning algorithm are a supervised learning, an unsupervised learning, a semi-supervised learning or reinforcement learning, but not limited to the example described above.

The artificial intelligence model may include a plurality of neural network layers. Each of the plurality of neural network layers has a plurality of weight values, and a neural network operation is performed through an operation between an operation result of a previous layer and a plurality of weight values. The plurality of weight values of the plurality of neural network layers may be optimized by a learning result of the artificial intelligence model. For example, a plurality of weight values may be updated such that a loss value or a cost value acquired from the artificial intelligence model during the learning process is reduced or minimized.

Figure 2A:
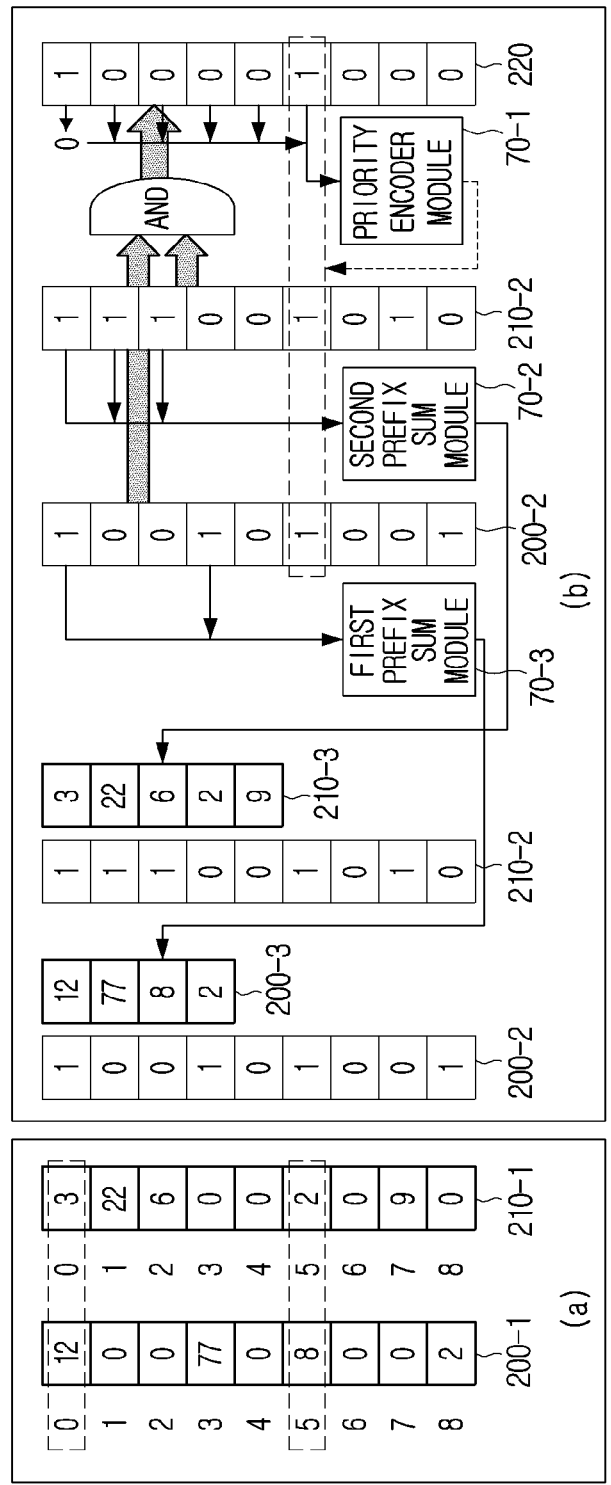
FIG. 2A illustrates another method of processing according to an embodiment.

FIG. 2A is a view illustrating a process in which the electronic apparatus 100 acquires output data by using a second operation method among a plurality of operation methods, according to an embodiment.

As illustrated in (a) of FIG. 2A, the first index data 200-2 and the second index data 210-2 are index data corresponding to the first data set 200-1 and the second data set 210-1 acquired based on weight values included in or assigned to the first data set 200-1 and second data set 210-1. In addition, the first compressed data 200-3 and the second compressed data 210-3 have only non-zero weight values except for sparse components in the first and second data sets 200-1 and 210-1, respectively.

FIG. 2A assumes that the electronic apparatus 100 determines a second operation method among the plurality of methods because the sparsity ratio of the first output data 220 output by performing an AND operation between the first index data 200-2 and the second index data 210-2 exceeds a threshold value.

As shown in FIGS. 1B and 2A, the electronic apparatus 100 may use a compression operation module 70 including a priority encoder module 70-1 and a plurality of prefix sum modules 70-2 and 70-3 to acquire a second output data. Specifically, the electronic apparatus 100 may identify valid data information corresponding to data on which an actual operation is to be performed using the first output data 220 through the priority encoder module 70-1. The electronic apparatus 100 may identify that an actual operation may be performed between valid data having a 0th index and valid data having a fifth index among the first output data 220.

Figure 2B:
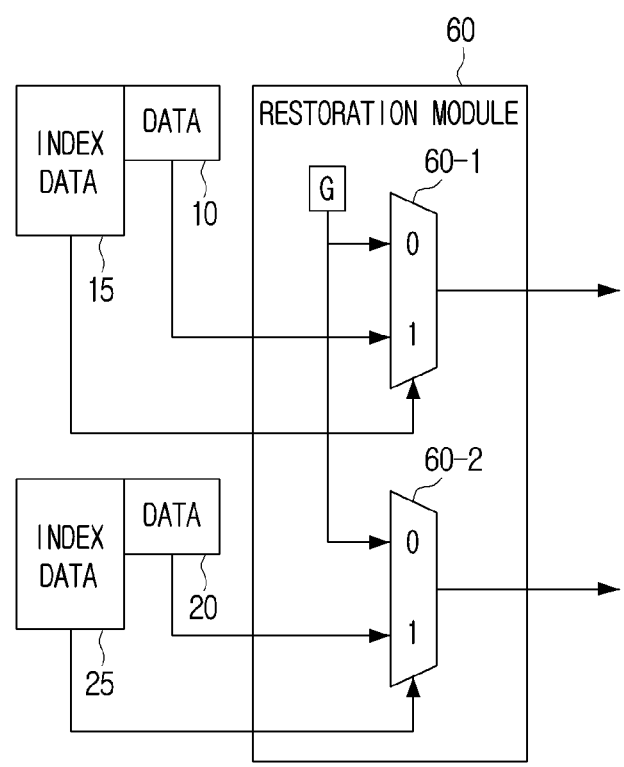
FIG. 2B is a view illustrating a first method among a plurality of operation methods according to an embodiment.

Referring to FIG. 2B, the electronic apparatus 100 may identify data matching valid data corresponding to the data to be actually operated through the first prefix sum module 70-3 and the second prefix sum module 70-2. Specifically, the electronic apparatus 100 may identify that two valid data before the valid data having a fifth index in the first index data 200-2 through the first prefix sum module 70-3. In this case, the first prefix sum module 70-3 includes various operation logics such as adder logic, or the like, and thus the number of valid data before effective data to be actually calculated may be identified during one cycle. Accordingly, the electronic apparatus 100 may identify, through the first prefix sum module 70-3, that data corresponding to valid data having the fifth index among compressed data is third data.

Similarly, the electronic apparatus 100 may identify that the second index data 210-2 includes three valid data before the valid data having the fifth index, through the second prefix sum module 70-2. Accordingly, the electronic apparatus 100 may identify, through the second prefix sum module 70-2, that data corresponding to valid data having the fifth index among compressed data is fourth data.

In addition, the electronic apparatus 100 may acquire 16 by performing a multiplication operation between 8, which is the third data of the first compressed data 200-3, and 2, which is the fourth data of the second compressed data 210-3. Meanwhile, through the method described above, the electronic apparatus 100 may identify that the data to be actually operated is the first data among the compressed data 220-3 and 210-3, respectively. Accordingly, the electronic apparatus 100 may acquire 36 by multiplying 12 and 3 which are the first data of each compressed data. In addition, the electronic apparatus 100 may acquire second output data (e.g., 52) by adding values (e.g., 36 and 16) on which a multiplication operation is performed.

FIG. 2B is a view illustrating a process in which the electronic apparatus 100 acquires output data by using a first operation method among a plurality of operation methods, according to an embodiment of the disclosure. FIG. 2B assumes that a sparsity ratio of first output data acquired by performing an AND operation on index data corresponding to a plurality of data sets exceeds a threshold value, such that the electronic apparatus 100 determines a first operation method among the plurality of methods.

The electronic apparatus 100 may input the index data 15 and 25 corresponding to the plurality of data sets and the compressed data 10 and 20 corresponding to each data set to a restoration module 60. The restoration module 60 may include a plurality of operation modules 60-1 and 60-2. When 0 of the index data is input, each operation module 60-1 and 60-2 may output 0, and when 1 (or valid data) of the index data is input, each operation module 60-1 and 60-2 may output data corresponding to valid data among compressed data.

For example, the electronic apparatus 100 may input the first index data 15 corresponding to the first data set and the compressed data 10 corresponding to the first data set to the first operation module 60-1 among the restoration modules to acquire components included in the first data set. The electronic apparatus 100 may acquire a component included in the second data set by inputting the second index data 25 corresponding to the second data set and the compressed data 20 corresponding to the second data set to the second operation module 60-2 among the restoration modules.

In addition, the electronic apparatus 100 may perform a multiplication operation between the components output from the first operation module 60-1 and the second operation module 60-2, and perform a sum operation between result values on which the multiplication operation to acquire the second output data.

Figure 3:
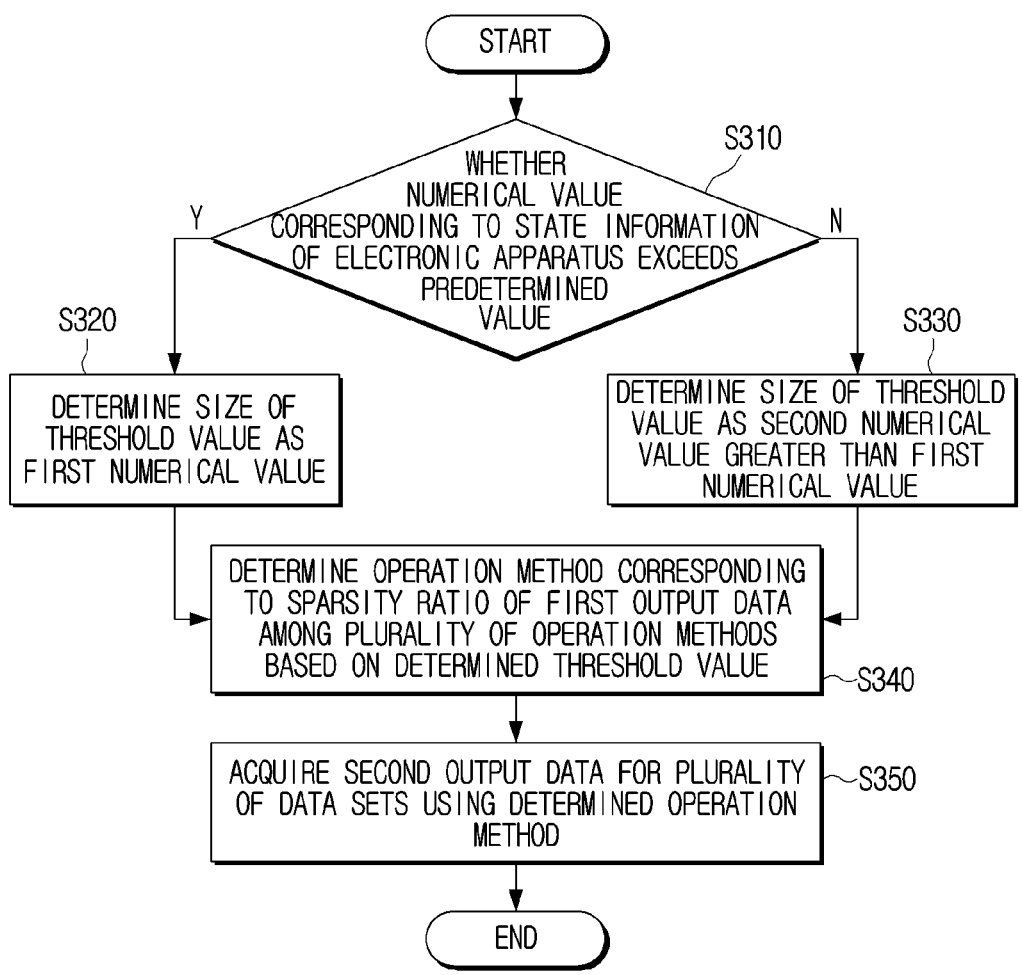
FIG. 3 is a flowchart illustrating a process in which an electronic apparatus determines a threshold value according to an embodiment.

FIG. 3 is a flowchart illustrating a process in which the electronic apparatus 100 determines a threshold value for comparison with a sparsity ratio of first output data in order to determine one of a plurality of operation methods based on status information of the electronic apparatus 100.

The electronic apparatus 100 may identify whether a numerical value corresponding to the status information of the electronic apparatus exceeds a predetermined value (operation S310). Here, the status information of the electronic apparatus 100 may refer to information on resources required for the electronic apparatus 100 to perform a specific operation, and include, for example, a remaining battery level of the electronic apparatus and available resources of the processor 120.

For example, the electronic apparatus 100 may identify a current remaining amount of the battery and identify whether the identified remaining amount exceeds a first predetermined value. The electronic apparatus 100 may identify whether the available resource of the current processor 120 exceeds a second predetermined value. In this case, the available resources of the processor 120 may include resources necessary to perform an operation between a plurality of data sets except for a task currently executed by the processor 120 or a task performed in the background. The first predetermined value and the second predetermined value may be changed by a user command.

If it is identified that the numerical value corresponding to the status information of the electronic apparatus 100 exceeds the predetermined value, the electronic apparatus 100 may determine a size of the threshold value as a first numerical value (operation S320). For example, when the remaining amount of the battery exceeds the first predetermined value and the available resources of the processor 120 exceeds a second predetermined value, the electronic apparatus 100 may set the threshold value to a relatively small first numerical value. Accordingly, when a battery level is high, the sparsity ratio of the first output data is more likely to exceed the threshold value since the threshold value is set to a relatively low value, and thus the electronic apparatus 100 is more likely to use additional operation logic gates to increase performance for processing a plurality of data sets.

When it is identified that the numerical value corresponding to the status information of the electronic apparatus 100 is equal to or less than the predetermined value, the electronic apparatus 100 may determine the size of the threshold value as a second numerical value greater than the first numerical value (operation S330). For example, when the remaining amount of the battery is less than or equal to the first predetermined value or the available resources of the processor 120 are less than or equal to the second predetermined value, the electronic apparatus 100 may determine the threshold value as a relatively high second numerical value. Accordingly, the probability that the sparsity ratio of the first output data is equal to or less than the threshold value may increase. When the sparsity ratio is equal to or less than a threshold value, which is a relatively high second numerical value, the electronic apparatus 100 may reduce energy consumption by performing an operation between a plurality of data sets without using a hardware module including additional operation logic.

The electronic apparatus 100 may determine an operation method corresponding to the sparsity ratio of the first output data among a plurality of operation methods based on the determined threshold value (operation S340). In other words, the electronic apparatus 100 may identify whether the sparsity ratio of the first output data exceeds a threshold value determined by one of the first numerical value or the second numerical value.

When the sparsity ratio of the first output data is less than or equal to the threshold value, the electronic apparatus 100 may determine a first method among a plurality of operation methods, and when the sparsity ratio of the first output data exceeds the threshold value, the electronic apparatus 100 may determine a second method among the plurality of operation methods.

In addition, the electronic apparatus 100 may acquire second output data for a plurality of data sets by using the determined operation method (operation S350). Since the process in which the electronic apparatus 100 acquires output data using each operation method has been described above, a redundant description thereof will be omitted.

Figure 4:
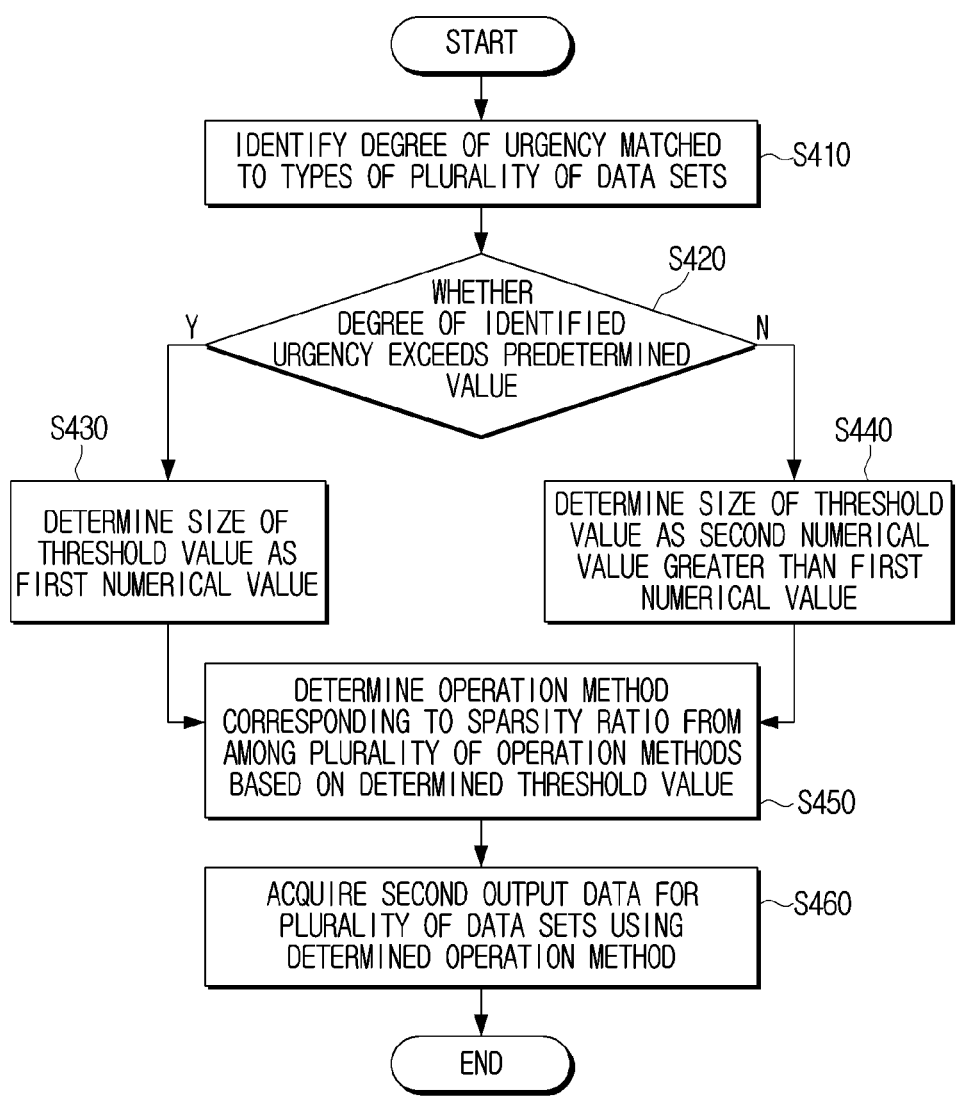
FIG. 4 is a flowchart illustrating a process in which an electronic apparatus determines a threshold value according to an embodiment.

FIG. 4 is a flowchart illustrating a process in which the electronic apparatus 100 determines a threshold value based on a degree of urgency corresponding to types of a plurality of data sets, according to an embodiment of the disclosure.

The electronic apparatus 100 may identify the degree of urgency corresponding to the types of the plurality of data sets (operation S410). For example, since a data set for processing a user voice, a data set to be processed for execution of a navigation application, or the like, must be urgently processed, a high degree of urgency may be given to each data set. In addition, since a data set for processing image data or the like does not need to be processed relatively urgently, a relatively low value of urgency may be given. However, this is only an example, and the degree of urgency assigned to different types of data sets may be changed differently by the user.

The electronic apparatus 100 may identify whether the degree of the identified urgency exceeds a predetermined value (operation S420). In this case, the predetermined value may be changed by the user. When the degree of urgency exceeds the predetermined value, the electronic apparatus 100 may determine the size of the threshold value as the first numerical value (operation S430). Meanwhile, when the degree of urgency is less than or equal to a predetermined value, the electronic apparatus 100 may determine the size of the threshold value as a second numerical value greater than the first numerical value (operation S440).

In other words, if it is identified that the data set needs to be urgently processed, the electronic apparatus 100 may increase a probability that a sparsity ratio of the first output data is higher than the threshold value by determining the threshold value as a relatively small value. Accordingly, the electronic apparatus 100 may increase operation performance for processing a plurality of data sets by using a hardware module including additional operation logic. Meanwhile, if it is identified that there is no need to process the data set relatively urgently, the electronic apparatus 100 may increase a probability that the sparsity ratio of the first output data is lower than the threshold value by determining the threshold value as a relatively high value. Accordingly, the electronic apparatus 100 may reduce energy consumption by performing an operation between a plurality of data sets without using a hardware module including additional operation logic.

In addition, the electronic apparatus 100 may determine an operation method corresponding to the sparsity ratio of the first output data from among a plurality of operation methods based on the determined threshold value (operation S450). The electronic apparatus 100 may acquire second output data for a plurality of data sets by using the determined operation method (operation S460). Since the descriptions related to operations S450 and S460 have been described above, they will be omitted.

Figure 5:
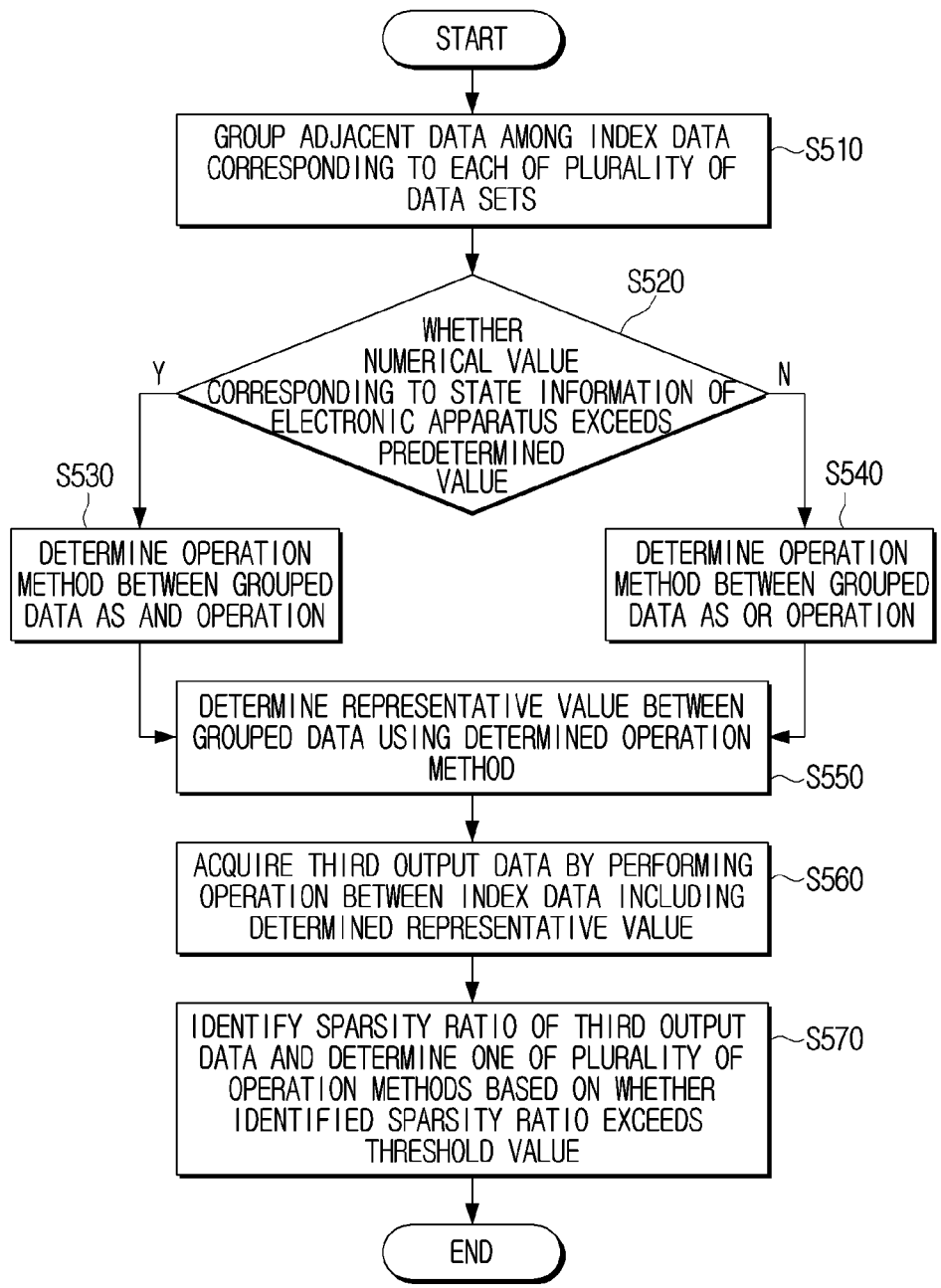
FIG. 5 is a flowchart illustrating a process in which an electronic apparatus determines an operation method between grouped data according to an embodiment.

FIG. 5 is a view illustrating a process of determining, by the electronic apparatus 100, a representative value of grouped data among index data, according to an embodiment of the disclosure.

The electronic apparatus 100 may group adjacent data among the index data corresponding to each of the plurality of data sets by a predetermined size. (operation S510). The size unit for grouping the index data may be a predetermined value, but this is only an example and the value may be changed by the user.

The electronic apparatus 100 may identify whether a numerical value corresponding to the status information of the electronic apparatus exceeds a predetermined value (operation S520). When the numerical value corresponding to the status information of the electronic apparatus exceeds a predetermined value, the electronic apparatus 100 may determine the operation method between the grouped data as an AND operation (operation S530). For example, when the remaining battery level of the electronic apparatus exceeds a first predetermined value and the available resources of the processor 120 exceeds a second predetermined value, the electronic apparatus 100 may determine the operation method between the grouped data as the AND operation.

In other words, when the remaining amount of the battery and the available resources of the processor are sufficient, the electronic apparatus 100 may determine a representative value by performing the AND operation between the grouped data. Since the component of index data is 0 or 1, when the operation method is determined as the AND operation, a probability that the result value will be 0 may be higher than when an OR operation is performed. Accordingly, a probability that a sparsity ratio of the first output data is higher than the threshold value may increase. Accordingly, the electronic apparatus 100 may increase the operation performance performed between the plurality of data sets by using a hardware module including additional operation logic.

When the numerical value corresponding to the status information of the electronic apparatus is equal to or less than the predetermined value, the electronic apparatus 100 may determine the operation method between the grouped data as the OR operation (operation S540). For example, when the remaining battery level of the electronic apparatus is less than or equal to a first predetermined value, or the available resources of the processor is less than or equal to a second predetermined value, the electronic apparatus 100 may determine an operation method between the grouped data as the OR operation.

In other words, when the remaining battery level or the available resources of the processor are insufficient, the electronic apparatus 100 may determine a representative value by performing an OR operation between the grouped data. When an operation method between grouped data is determined as the OR operation, a probability that the result value will be 1 may be higher than when an AND operation is performed. Accordingly, a probability that the sparsity ratio of the first output data is lower than the threshold value may increase. Accordingly, the electronic apparatus 100 may reduce energy consumption by performing an operation between a plurality of data sets without using a hardware module including additional operation logic.

The electronic apparatus 100 may determine a representative value between the grouped data using the determined operation method (operation S550). In addition, the electronic apparatus 100 may acquire third output data by performing an operation between the index data including the determined representative value (operation S560).

In addition, the electronic apparatus 100 may identify the sparsity ratio of the third output data and determine one of a plurality of operation methods based on whether the identified sparsity ratio exceeds a threshold value (operation S570). Since the process of determining the operation method based on the threshold has been described above, a redundant description will be omitted.

Figure 6:
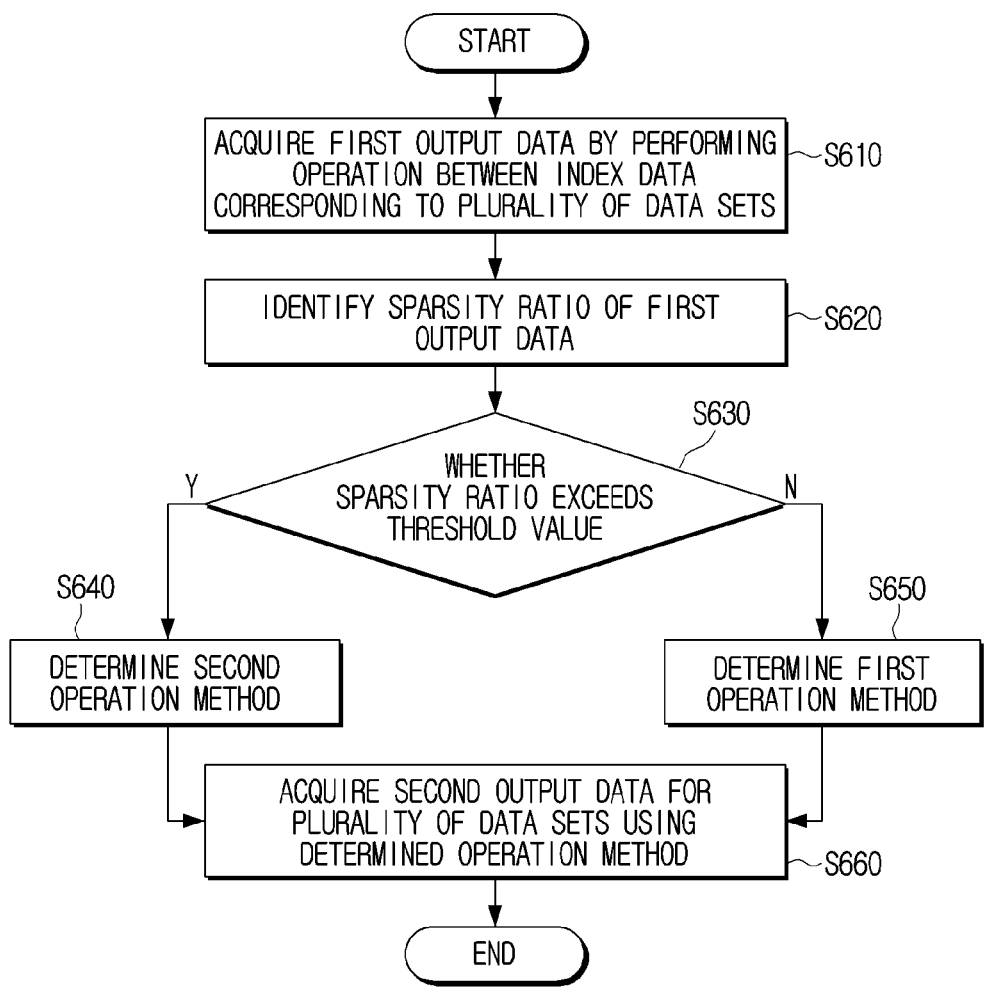
FIG. 6 is a flowchart illustrating a method of controlling an electronic apparatus according to an embodiment.

FIG. 6 is a view illustrating a method of controlling the electronic apparatus 100 according to an embodiment of the disclosure.

The electronic apparatus 100 may acquire first output data by performing an operation between index data corresponding to a plurality of data sets (operation S610). Specifically, the electronic apparatus 100 may acquire index data corresponding to a plurality of data sets and perform an AND operation between the acquired index data to acquire first output data.

The electronic apparatus 100 may identify the sparsity ratio of the first output data (operation S620). Specifically, the electronic apparatus 100 may identify a ratio of elements having a zero (0) value among all elements included in the first output data.

In addition, the electronic apparatus 100 may identify whether the sparsity ratio of the first output data exceeds a threshold value (operation S630). In this case, the threshold value may be a predetermined value, but this is only an example, and the electronic apparatus 100 may change the threshold value according to status information of the electronic apparatus 100 or a degree of urgency corresponding to the plurality of data sets.

When the sparsity ratio exceeds the threshold value, the electronic apparatus 100 may determine a second operation method as an operation method of the electronic apparatus 100 among a plurality of operation methods (operation S640). The second method is a method of identifying valid data matched with data to be operated on each index data using the first output data, and compressively performing an operation only on data matched with the identified valid data.

When the sparsity ratio does not exceed the threshold value, the electronic apparatus 100 may determine a first operation method as an operation method of the electronic apparatus 100 among a plurality of operation methods (operation S650). The first operation method is a method of directly performing a multiplication operation between a plurality of data sets.

In addition, the electronic apparatus 100 may acquire second output data for a plurality of data sets by using the determined operation method (operation S660).

Figure 7:
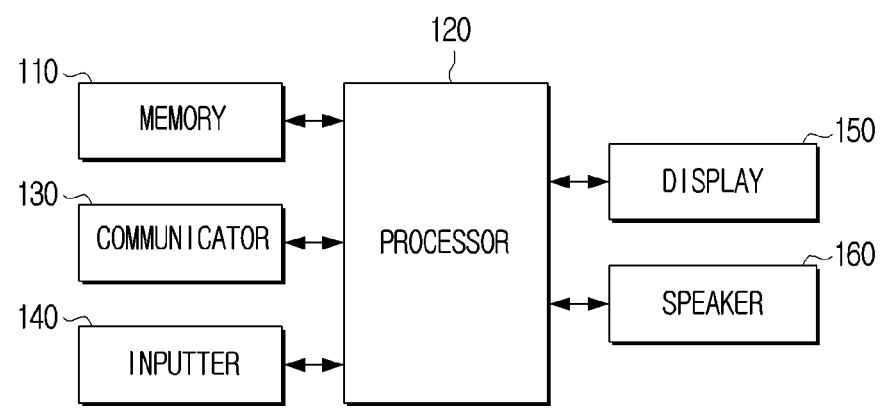
FIG. 7 is a detailed block diagram illustrating a configuration of an electronic apparatus according to an embodiment of the disclosure.

FIG. 7 is a block diagram illustrating a configuration of an electronic apparatus 100. As illustrated in FIG. 7, the electronic apparatus 100 may include a memory 110, a processor 120, a communicator (e.g., communication circuitry or a communication interface) 130, an inputter (e.g., including input circuitry) 140, a display (e.g., an output unit including output circuitry) 150, and a speaker 160. Meanwhile, since the memory 110 and the processor 120 have been described in detail with reference to FIGS. 1A to 1D, redundant descriptions will be omitted.

The communicator 130 includes a circuit and may communicate with a server or an external device. Specifically, the processor 120 may receive and transmit various data or information from a server or an external device connected through the communicator 130. Particularly, the communicator 130 may receive input data from an external server or an external device.

In addition, the communicator 130 may include various communication modules to communicate with an external device or server. The communicator 130, for example, may include a wireless communication module and may include a cellular communication module using at least one among long-term evolution (LTE), LTE Advance (LTE-A), code division multiple access (CDMA), wideband CDMA (WCDMA), universal mobile telecommunications system (UMTS), Wireless Broadband (WiBro), 5th generation (5G), and Global System for Mobile Communications (GSM). As another example, the wireless communication module may include, for example, at least one of wireless fidelity (Wi-Fi), Bluetooth, and Bluetooth low energy (BLE).

The inputter 140 includes a circuit, and the processor 120 may receive a user command or various data for controlling the operation of the electronic apparatus 100 through the inputter 140. The inputter 140 may include a touch sensor, a (digital) pen sensor, a pressure sensor, a key, or the like. The touch sensor may, for example, use at least one of electrostatic type, pressure sensitive type, infrared type, and an ultraviolet type.

Particularly, the inputter 140 may receive a command for changing the threshold value from the user. In other words, the processor 120 may receive a user command for changing the threshold value through the inputter 140, and may change the threshold value according to the received user command. Accordingly, the processor 120 may determine an operation method corresponding to the sparsity ratio among a plurality of operation methods based on whether the sparsity ratio of the first output data exceeds the changed threshold value.

The display 150 may be implemented as Liquid Crystal Display Panel (LCD), Organic Light Emitting Diodes (OLED), or the like, and may also be implemented as a flexible display, transparent display, or the like. The display 150 may be a touch screen including a touch panel. However, it is not limited to the implementation described above, and the display 150 may be implemented differently depending on the type of the electronic apparatus 100.

In addition, the display 150 may display various information under the control of the processor 120. Particularly, the display 150 may display a UI for changing the threshold value. Also, the display 140 may display input data input through the inputter 140 and output data acquired by performing an operation between a plurality of data sets. Also, the display 150 may display a message indicating that the remaining battery level of the electronic apparatus 100 or the resource of the processor 120 is less than or equal to a predetermined value or may display an indicator corresponding thereto.

The speaker 160 may include various audio output circuitry and is configured to output various kinds of alarm sounds or voice messages in addition to various audio data on which various processing operations such as decoding, amplification, and noise filtering are performed by an audio processor. Particularly, the speaker 160 may output a message indicating that the remaining battery level of the electronic apparatus 100 or the resource of the processor 120 is less than or equal to a predetermined value in a voice form or may output a notification sound corresponding thereto.

According to various embodiments of the disclosure described above, the electronic apparatus 100 may determine an operation method according to the sparsity ratio of the data set and acquire output data using the determined operation method to improve operation performance and improve energy efficiency.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

The terms "have", "may have", "include", and "may include" used in the exemplary embodiments of the present disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element (e.g., a third element) may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, the processor configured to perform "A, B, and C" may be realized a dedicated processor for performing functions (for example, embedded processor) or a generic-purpose processor for performing functions by running one or more software programs stored in a memory device (for example, a CPU or an application processor).

The electronic apparatus 100 may be implemented as various electronic apparatuses including, for example, and without limitation, a smartphone, a tablet PC, a desktop PC, a laptop PC, a netbook computer, a PDA, a portable multimedia player (PMP), a wearable device, or the like. According to another embodiment, the electronic apparatus 100 may be implemented as a device receiving a photographed image of the video wall from an external camera and obtaining layout information of the video wall from the received image. According to another embodiment, the electronic apparatus may include at least one of televisions, refrigerators, air conditioners, air cleaners, set-top boxes, media boxes (e.g., Samsung HomeSync™, Apple TV™, or Google TV™).

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product (e.g., downloadable app) may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

What is claimed is:

1. An electronic apparatus comprising:
a memory; and
a processor configured to:
perform an operation between a first index data and a second index data corresponding to a first data set and a second data set, respectively, to acquire first output data;
identify a sparsity ratio of the first output data;
based on whether the sparsity ratio exceeds a threshold value, determine an operation method corresponding to the sparsity ratio from among a plurality of operation methods; and
acquire second output data with respect to the first index data and the second index data by using the determined operation method,
wherein the processor is configured to:

based on the sparsity ratio exceeding the threshold value, determine, as the operation method, a first method of processing the first data set and the second data set using the first data set and the second data set; and based on the sparsity ratio being equal to or less than the threshold value, identify valid data included in the first index data and the second index data, and determine, as the operation method, a second method of processing the first data set and the second data set using the valid data.

2. The electronic apparatus of claim 1, wherein the processor is configured to:
based on at least one of status information of the electronic apparatus and types of the first data set and the second data set, determine the threshold value, and
based on the threshold value, determine the operation method corresponding to the sparsity ratio from among the plurality of operation methods.

3. The electronic apparatus of claim 2,
wherein the status information of the electronic apparatus includes at least one of a remaining battery level of the electronic apparatus and a usage amount of the processor.

4. The electronic apparatus of claim 3, wherein the processor is further configured to:
based on the remaining battery level of the electronic apparatus exceeding a predetermined value, determine the threshold value as a first numerical value, and
based on the remaining battery level being equal to or less than the predetermined value, determine the threshold value as a second numerical value,
wherein the first numerical value is less than the second numerical value.

5. The electronic apparatus of claim 3, wherein the processor is further configured to:
identify a degree of urgency that corresponds to the types of the first data set and the second data set,
based on the degree of urgency exceeding a predetermined value, determine the threshold value as a third numerical value, and
based on the degree of urgency being equal to or less than the predetermined value, determine the threshold value as a fourth numerical value,
wherein the third numerical value is less than the fourth numerical value.

6. The electronic apparatus of claim 1, wherein the processor is further configured to:
group adjacent data of the first index data by a predetermined size as a first data group, and group adjacent data of the second index data by the predetermined sized as a second data group;
determine a first representative value and a second representative value of the first data group and the second data group,
perform a logic operation between the first representative value and the second representative value to acquire third output data, and identify a sparsity ratio of the third output data,
based on whether the sparsity ratio of the third output data exceeds the threshold value, determine the operation method based on the sparsity ratio of the third output data.

7. The electronic apparatus of claim 6, wherein the processor is configured to:
based on at least one of the status information of the electronic apparatus and the types of the first data set and the second data set, determine another logic operation to be performed between the first data group and the second data group, and
process the first data group and the second data group by using the other logic operation to determine the first representative value and the second representative value.

8. The electronic apparatus of claim 7, wherein the processor is further configured to:
based on the remaining battery level of the electronic apparatus exceeding a predetermined value, determine the logic operation to be performed between the first data group and the second data group as an AND operation, and
based on the remaining battery level of the electronic apparatus being equal to or less than the predetermined value, determine the logic operation to be performed between the first data group and the second data group as an OR operation.

9. The electronic apparatus of claim 1, wherein the processor is further configured to: based on a user command for changing the threshold value being input, change the threshold value according to the user command, and
based on whether the sparsity ratio exceeds the changed threshold value, determine the operation method corresponding to the sparsity ratio from among the plurality of operation methods.

10. The electronic apparatus of claim 1, wherein the processor is further configured to:
based on the operation method corresponding to the sparsity ratio being determined as the first method, restore the first data set and the second data set by using data corresponding to the first index data, the second index data, and the valid data, and
process the restored first data set and the restored second data set to acquire the second output data.

11. A method for controlling an electronic apparatus, the method comprising:
performing an operation between a first index data and a second index data corresponding to a first data set and a second data set, respectively to acquire first output data;
identifying a sparsity ratio of the first output data;
based on whether the sparsity ratio exceeds a threshold value, determining an operation method corresponding to the sparsity ratio from among a plurality of operation methods; and
acquiring second output data with respect to the first index data and the second index data by using the determined operation method,
wherein the determining the operation method comprises:
based on the sparsity ratio exceeding the threshold value, determining, as the operation method, a first method of processing the first data set and the second data set using the first data set and the second data set, and
based on the sparsity ratio being equal to or less than the threshold value, identifying valid data included in the first index data and the second index data, and determining, as the operation method, a second method of processing the first data set and the second data set using the valid data.

12. The method of claim 11, further comprising:
based on at least one of status information of the electronic apparatus and types of the first data set and the second data set, determining the threshold value; and based on the threshold value, determining the operation method corresponding to the sparsity ratio from among the plurality of operation methods.

13. The method of claim 12, wherein the status information of the electronic apparatus includes at least one of a remaining battery level of the electronic apparatus and a usage amount of a processor of the electronic apparatus.

14. The method of claim 13, wherein the determining the operation method includes, based on the remaining battery level of the electronic apparatus exceeding a predetermined value, determining the threshold value as a first numerical value, and based on the remaining battery level being equal to or less than the predetermined value, determining the threshold value as a second numerical value, wherein the first numerical value is less than the second numerical value.

15. The method of claim 13, wherein the determining the operation method includes identifying a degree of urgency that corresponds to the types of the first data set and the second data set, based on the degree of urgency exceeding a predetermined value, determining the threshold value as a third numerical value, and based on the degree of urgency being equal to or less than the predetermined value, determining the threshold value as a fourth numerical value, wherein the third numerical value is less than the fourth numerical value.

16. A non-transitory computer-readable storage medium storing a program that is executable by at least one processor to perform a method for controlling an electronic apparatus, the method comprising:
obtaining first output data based on a first index data of a first data set and a second index data of a second data set;
based on a sparsity ratio of the first output data exceeding a threshold value, obtaining second output data by processing the first data set and the second data set using a first operation method; and
based on the sparsity ratio of the first output data not exceeding the threshold value, obtaining third output data by processing the first data set and the second data set using a second operation method that is different from the first operation method.

17. The non-transitory computer-readable storage medium of claim 16, wherein the method further comprises:
setting the threshold value differently according to a remaining battery level of the electronic apparatus.

18. The non-transitory computer-readable storage medium of claim 16, wherein the method further comprises:
setting the threshold value differently according to an energy usage amount of the at least one processor.

19. The non-transitory computer-readable storage medium of claim 16, wherein the obtaining of the first output data comprises:
based on a remaining battery level of the electronic apparatus exceeding a predetermined value, performing an AND operation on immediately adjacent data bits of each of the first index data and the second index data, to obtain the first output data, and
based on the remaining battery level of the electronic apparatus exceeding the predetermined value, performing an OR operation on the immediately adjacent data bits of each of the first index data and the second index data, to obtain the first output data.

20. The non-transitory computer-readable storage medium of claim 16, wherein the obtaining of the first output data comprises:
based on an energy usage amount of the processor exceeding a predetermined value, performing an AND operation on immediately adjacent data bits of each of the first index data and the second index data, to obtain the first output data, and
based on the energy usage amount of the processor exceeding the predetermined value, performing an OR operation on the immediately adjacent data bits of each of the first index data and the second index data, to obtain the first output data.

* * * * *